(12) United States Patent
Riddell

(10) Patent No.: US 10,706,595 B2
(45) Date of Patent: Jul. 7, 2020

(54) SYSTEM AND METHOD FOR RECONSTRUCTING AN OBJECT VIA TOMOGRAPHY

(71) Applicant: GENERAL ELECTRIC COMPANY, Schenectady, NY (US)

(72) Inventor: Cyril Riddell, Issy les Moulineaux (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 53 days.

(21) Appl. No.: 15/457,215

(22) Filed: Mar. 13, 2017

(65) Prior Publication Data

US 2018/0260980 A1  Sep. 13, 2018

(51) Int. Cl.
*G06K 9/00* (2006.01)
*G06T 11/00* (2006.01)

(52) U.S. Cl.
CPC ....... *G06T 11/006* (2013.01); *G06T 2211/421* (2013.01)

(58) Field of Classification Search
None
See application file for complete search history.

(56) References Cited

U.S. PATENT DOCUMENTS

| 4,262,204 A | 4/1981 | Mirabella |
| 5,043,890 A | 8/1991 | King |
| 5,761,257 A | 6/1998 | Toth et al. |
| 8,233,586 B1 * | 7/2012 | Boas ................ G06T 5/002 378/207 |
| 8,644,573 B2 | 2/2014 | Riddell |
| 8,942,450 B2 | 1/2015 | Riddell |
| 2014/0029819 A1 * | 1/2014 | Zeng ................ G06T 11/003 382/131 |
| 2018/0033165 A1 * | 2/2018 | Zeng ................ G06T 11/003 |

OTHER PUBLICATIONS

Boas et al., "Evaluation of two iterative techniques for reducing metal artifacts in computed tomography", Radiology: vol. 259: No. 3, Jun. 2011 (Year: 2011).*

Willemink et al., "Iterative reconstruction techniques for computed tomography Part 1: Technical principles", Eur Radiol (2013) 23: 1623-1631 (Year: 2013).*

* cited by examiner

*Primary Examiner* — Soo Jin Park
(74) *Attorney, Agent, or Firm* — Grogan, Tuccillo & Vanderleeden, LLP

(57) ABSTRACT

A method for reconstructing an object via tomography is provided. The method includes: acquiring a plurality of projections of the object at different angles via an imaging system; backprojecting each projection of the plurality to generate an intermediate image of each projection via at least one processor of the imaging system; and applying a filter to each intermediate image via the at least one processor. The filter is based at least in part on a noise model and an image model.

21 Claims, 3 Drawing Sheets

SYSTEM AND METHOD FOR RECONSTRUCTING AN OBJECT VIA TOMOGRAPHY

BACKGROUND

Technical Field

Embodiments of the invention relate generally to medical imaging systems, and more specifically, to a system and method for reconstructing an object via tomography.

Discussion of Art

Tomography is the process of imaging by sections, or sectioning through the use of a penetrating wave. Many imaging systems use tomography to generate two-dimensional ("2D") and/or three-dimensional ("3D") images of an object through a process commonly referred to as computed tomography ("CT") scanning/scans. Many CT scanning procedures involve reconstructing an imaged object from multiple projections of the object through a process known as backprojection.

Many backprojection procedures, known as filtered back projections ("FBP"), apply a reconstruction filter, e.g., a derivative or ramp filter, to acquired projections prior to backprojecting the projections, or to the backprojected images of the projections. Many reconstruction filters, however, do not concern and/or account for noise and/or edge blurring typically found within acquired projections. Accordingly, many FBP procedures incorporate one or more additional filters in an attempt to account for noise and/or to improve edge clarity within a reconstructed image. For example, many FBP procedures employ "post-filters" and/or "pre-filters." Post-filters are applied to a reconstructed image in an attempt to improve the clarity of the edges. Many post-filters, however, fail to adequately account for noise within the projections. Pre-filters are applied to the projections prior to completing the reconstructed image in an attempt to account for noise. Many pre-filters, however, do not adequately improve the clarity of edges within a reconstructed image.

What is needed, therefore, is an improved system and method for reconstructing an object via tomography.

BRIEF DESCRIPTION

In an embodiment, a method for reconstructing an object via tomography is provided. The method includes: acquiring a plurality of projections of the object at different angles via an imaging system; backprojecting each projection of the plurality to generate an intermediate image of each projection via at least one processor of the imaging system; and applying a filter to each intermediate image via the at least one processor. The filter is based at least in part on a noise model and an image model.

In another embodiment, an imaging system for reconstructing an object via tomography is provided. The imaging system includes at least one processor operative to: acquire a plurality of projections of the object at different angles via an imaging device; backproject each projection of the plurality to generate an intermediate image of each projection; and apply a filter to each intermediate image. The filter is based at least in part on a noise model and an image model.

In yet another embodiment, a non-transitory computer readable medium storing instructions is provided. The stored instructions are configured to adapt at least one processor to: acquire a plurality of projections of an object at different angles; backproject each projection of the plurality to generate an intermediate image of each projection; and apply a filter to each intermediate image. The filter is based at least in part on a noise model and an image model.

DRAWINGS

The present invention will be better understood from reading the following description of non-limiting embodiments, with reference to the attached drawings, wherein below:

DETAILED DESCRIPTION

Figure 1:
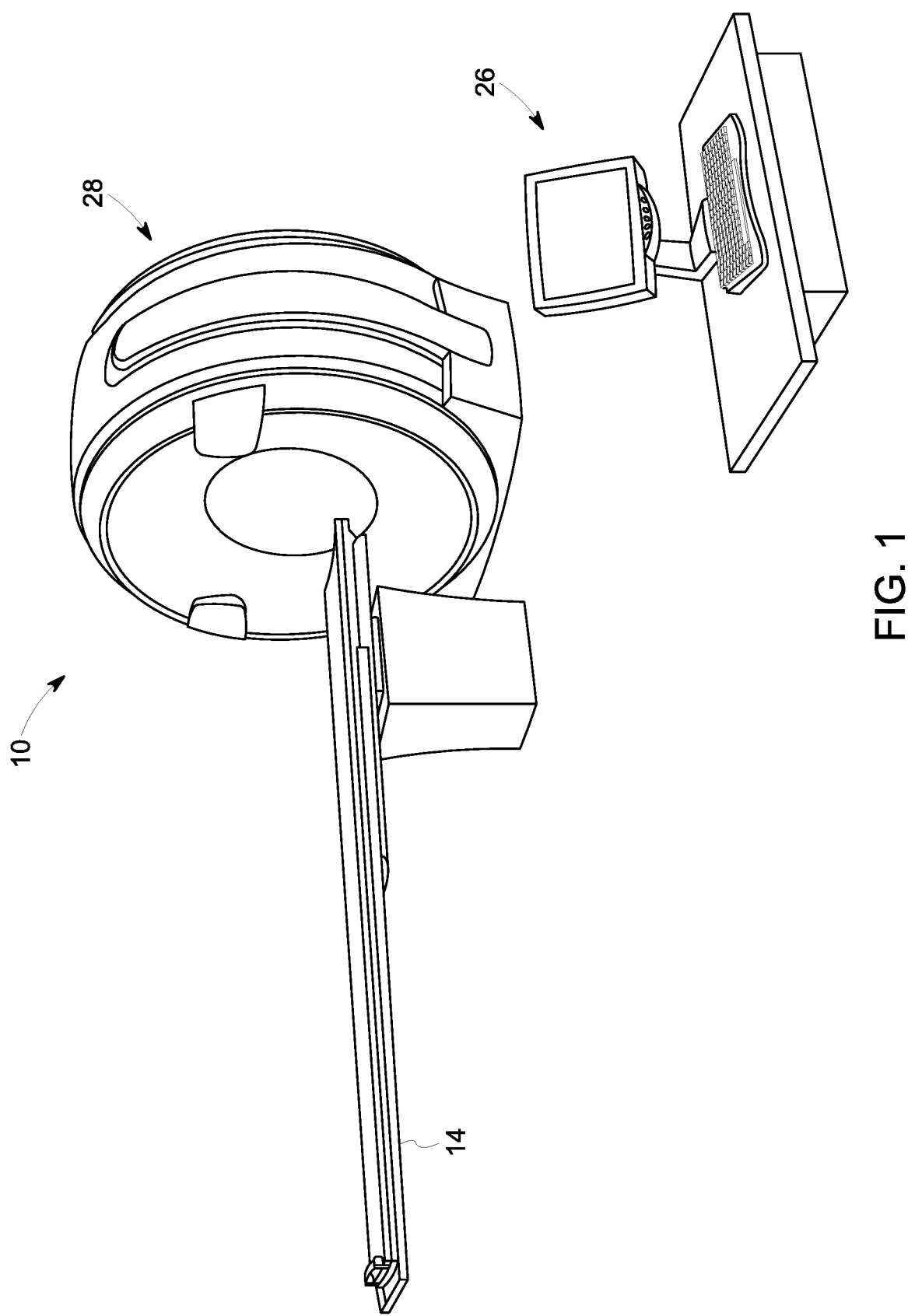
FIG. 1 is a perspective view of a system for reconstructing an object via tomography, wherein the system forms part of a CT scanner having an imaging assembly, in accordance with an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. The term "real-time," as used herein, means a level of processing responsiveness that a user senses as sufficiently immediate or that enables the processor to keep up with an external process.

Further, while embodiments of the invention are described herein with respect to a radiation based imaging system, e.g., x-ray tomography systems, it will be understood that in other embodiments the imaging system 10 may be a Magnetic Resonance Imaging ("MRI") system, a Positron Emission Tomography ("PET") system, a Single Photon Computed Tomography ("SPECT"), an ultrasound imaging system, or any other type of imaging system which utilizes tomography to reconstruct images from projections.

Figure 2:
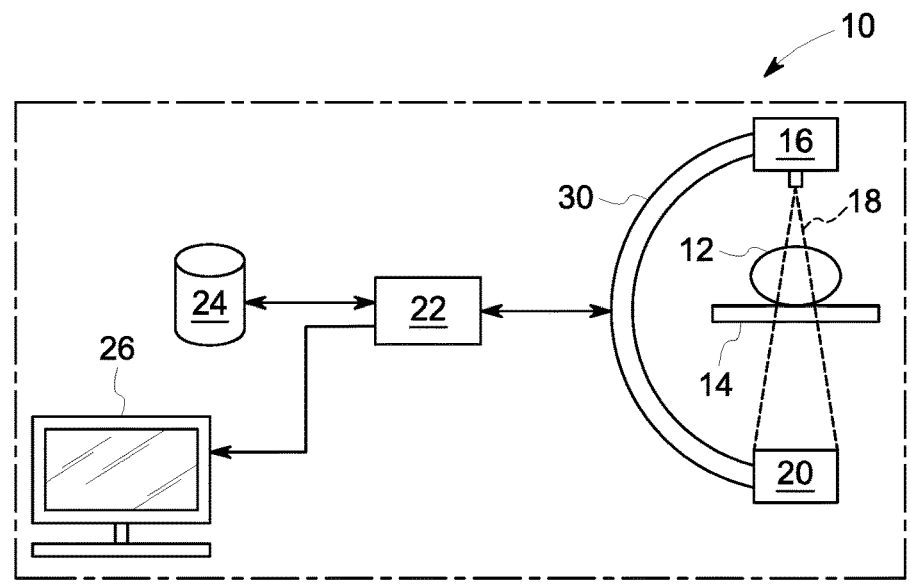
FIG. 2 is a block diagram of the system of FIG. 1, wherein the system forms part of a C-Arm scanner, in accordance with an embodiment of the invention.

Referring now to FIGS. 1 and 2, an imaging system 10 for reconstructing an object/patient/subject 12 (FIG. 2) via tomography is shown. The imaging system 10 includes a support 14 intended to receive the object 12, e.g., a patient to be examined/imaged, a radiation source 16 operative to emit a radiation beam 18, a detector 20 operative to receive the radiation beam 18 from the radiation source 16, a controller/at least one processor 22, a storage unit 24, and a display/user terminal 26. The radiation source 16 and the detector 20 may be rotatably disposed within an imaging assembly 28 (FIG. 1) or on an arm 30 (FIG. 2) such that the radiation source 16 and detector 20 are operative to rotate about the object 12.

Figure 3:
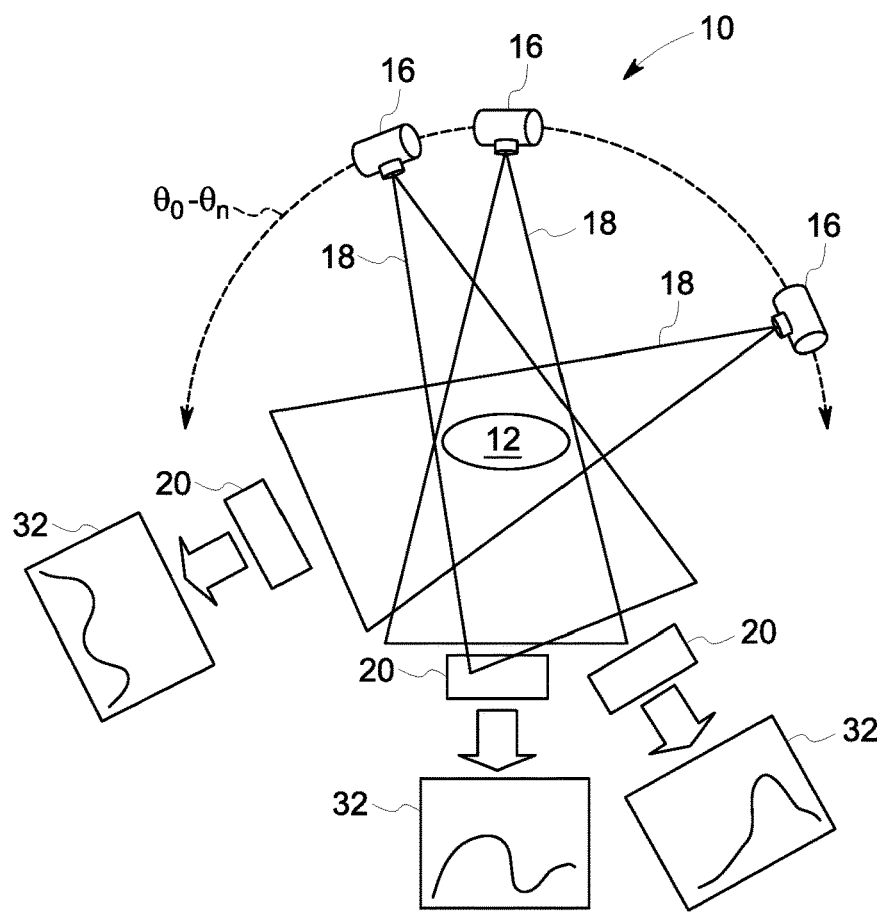
FIG. 3 is another block diagram of the system of FIG. 1, in accordance with an embodiment of the invention.

As illustrated in FIG. 3, the controller 22 is operative to acquire a plurality of projections 32 of the object 12 at different angles $\theta_0$-$\theta_n$ via the radiation source 16 and detector 20, collectively referred to hereinafter also as the "imaging device."

Figure 4:
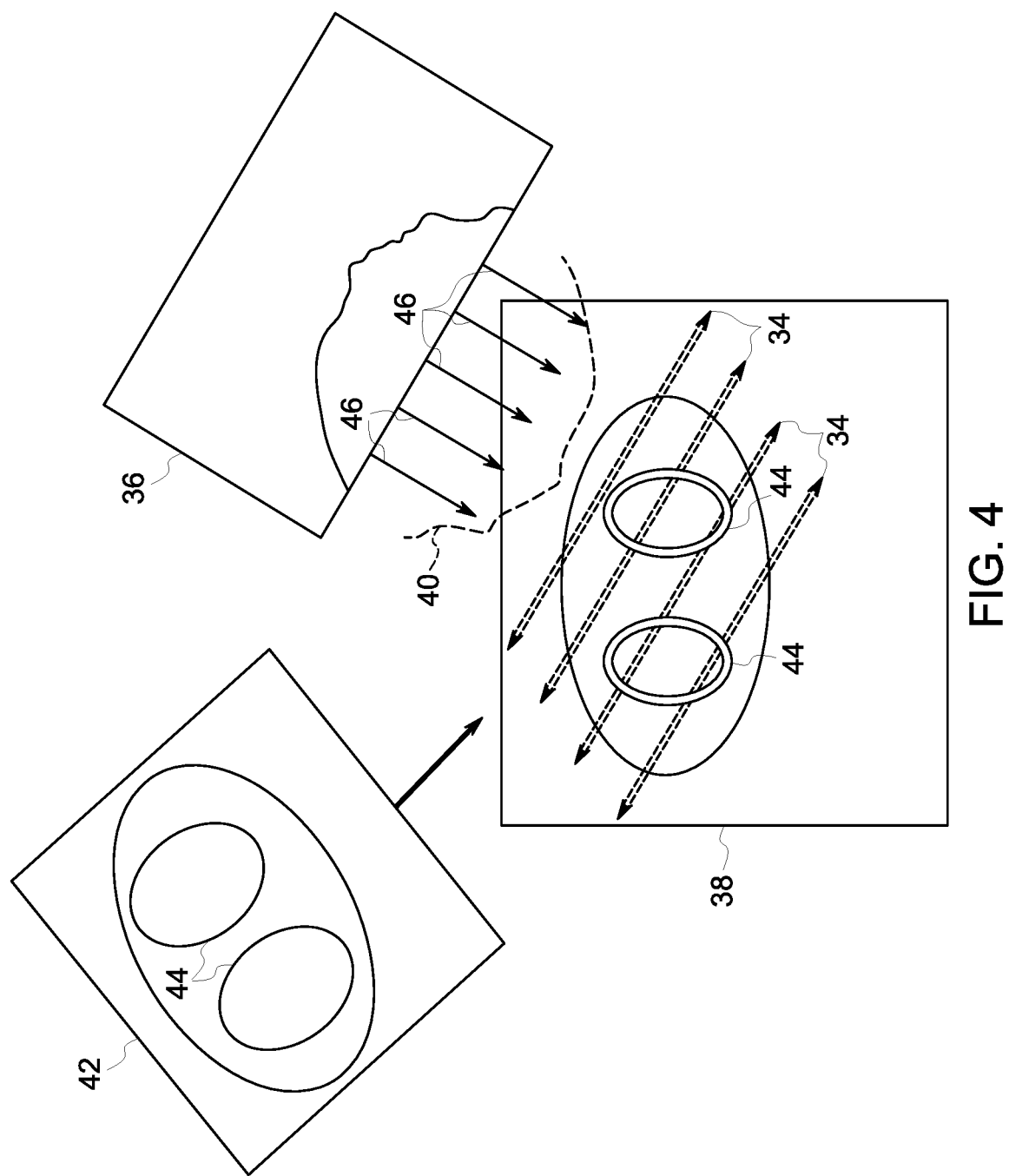
FIG. 4 is a diagram of a filter applied by the system of FIG. 1, in accordance with an embodiment of the invention.

Turning now to FIG. 4, a diagram of a filter, depicted as arrowed dashed lines 34, applied by the imaging system 10 is shown. As will be appreciated, for each projection 36 of the plurality 32 (FIG. 3), the controller 22 backprojects the projection 36 to generate an intermediate image 38, and applies the filter 34 to the intermediate image 38, where the filter 34 is based at least in part on a noise model 40 and an image model 42. After all of the intermediate images 38 have been filtered, the controller 22 then reconstructs the object 12 based at least in part on the intermediate images 38. For example, the controller 22 may sum the filtered intermediate images 38, in accordance with analytical or iterative algorithms, to generate a reconstructed image of the object 12.

As will be appreciated, the noise model 40 accounts for and seeks to correct for noise, e.g., statistical variations in the radiation beam 18 as received by the detector 20. As such, the noise model 40 may be based on statistical paradigms, e.g., Gaussian statistics, Poisson statistics, and/or other applicable paradigms. For example, in embodiments, the noise model 40 may be applied to the projection 36 so as to produce a set of weights $W_\Theta$ (depicted as the variations/curves in line 40), which as described in greater detail below, may be used to weight the filter 34.

The image model 42 defines, at least in part, the location of edges 44 within the intermediate image 38 based on a priori knowledge, e.g., the controller 22 may perform an initial reconstruction of the object 12 for the purpose of estimating the edges 44. For example, FIG. 4 shows an embodiment of the image/edge model 42 that defines the edges 44 associated with a set of lungs within the chest cavity of a patient 12 (FIG. 3). In embodiments, the image model 42 may be generated based on known characteristics such as size and/or shape of the object 12.

Application of the filter 34 to the intermediate image 38 imparts the information/data generated by the noise model 40 into the intermediate image 38 while preserving the edges 44 within the intermediate image 38 as defined by the image model 42. As such, in embodiments, the filter 34 processes the edges 44 differently than regions of the intermediate image 38 that do not contain edges 44. For example, the filter 34 may be weighted via weights generated by the noise model 40 and applied to the intermediate image 38 such that the regions of the intermediate image 38 that do not contain edges 44, according to the image model 42, receive the weighted filter 34, while the edges 44 within the intermediate image 38 do not receive the weighted filter 34.

In certain aspects of the invention, the generated weights may correspond to the accuracy of one or more regions within the projection 36, where the filter 34 imparts more of the data from high weighted regions of the projection 36 into the intermediate image 38, as compared to low weighted regions of the projection 36. As will be appreciated, weighting the filter 34 for each intermediate image 38 based on the weights generated by the noise model 40 for the particular projection 36 angle $\theta_x$ corresponding to, e.g., orthogonal to the backprojection lines 46 of, the intermediate image 38, drives the filter 34 in the direction of the underlying projection 36 angle $\theta_x$ for each intermediate image 38. In other words, and as will be described in greater detail below, the filter 34 is both driven by the noise model 40 to be radial and modulated by a single backprojection 36 via the aforementioned weights, while also dependent on an image prior 42. As will be understood, while the backprojection lines 46 are depicted in FIG. 4 as being parallel, in embodiments, the backprojection lines 46 may converge to a source point. Further, as the filter 34 preserves the edges 44 within an individual intermediate image 38, the edges 44 remain preserved in the final reconstruction. As such, the filter 34 is highly tailored to each intermediate image 38 while additionally preserving the edges 44 throughout the process.

Thus, embodiments of the invention include a new regularization strategy that merges the intrinsically angular information of a noise model of a tomographic acquisition with image spatial features in an intermediate space, e.g., the intermediate image 38. Additionally, and as will also be explained in greater detail below, embodiments of the invention provide for the data associated with the noise model 40 to be moved out of the data fidelity term and into the regularization term such that the noise propagation and filtering is exposed. As such, the data fidelity term is thus reduced to a non-weighted least-square term that can be combined with ramp filtering to both accelerate the convergence and ensure that regularization behaves as a diffusion-type regularization term. Accordingly, embodiments of the invention may implement one or more of the following formulas.

Noise-Driven 1D-Diffusion

In embodiments, where the coordinates (u,θ) are in the projection domain and Θ denotes the set of sampled directions, uniform diffusion of the data p(u,θ) is obtained by 1D-diffusion along u of each data array of index θ, and $\nabla_\theta$ denotes the gradient along u for direction θ (which is also the direction of the ramp filtering $D_\theta$ of the filtered back projection process). As such, filtering $G_\Theta(p)$ may be defined as:

$$G_\Theta(p_0) = \min_p \{½\|p-p_0\|^2 + \lambda\Sigma_\Theta p^t(\nabla_\theta{}^t\nabla_\theta p)\}$$

The uniform intensity of $G_\theta$ filtering may be given by scalar λ, and a non-uniform filtering may be obtained by inserting the statistical weights $W_\Theta$ that change with each direction θ∈Θ:

$$G_{W_\Theta}(p_0) = \min_p \{½(p-p_0)^t W_\Theta(p-p_0) + \lambda\Sigma_{\theta\in\Theta} p^t(\nabla_\theta{}^t\nabla_\theta)p\}$$

As will be appreciated, $G_{W_\Theta}(p_0)$ remains a filter since it can be re-written as:

$$G_{W_\Theta}(p_0) = \min_p \{½\|p-p_0\|^2 + \lambda\Sigma_{\theta\in\Theta} p^t(\nabla_\theta{}^t W_\theta{}^{-1}\nabla_\theta)p\}$$

While the above criterion fully controls noise propagation by filtering the noise according to $W_\Theta = \Sigma_{\theta\in\Theta} W_\theta$, it remains blind to image features.

Edge-Preserving 2D-Diffusion

As will be understood, uniform diffusion over the projection 36 prior to FBP is equivalent to uniform diffusion of the FBP-reconstructed image. For example, image diffusion based on $\nabla_{x_i}$, i.e., the gradient along axis $x_i$, may be computed by:

$$G(f) = \min_g \{½\|g-f\|^2 + \lambda\Sigma_i g^t(\nabla_{x_i}{}^t\nabla_{x_i})g\}$$

As such, in embodiments, the diffusion process is performed along each axis $x_i$ of the image according to rectangular coordinates, while projection filtering is performed according to a polar sampling. Thus, the output is equivalent for uniform diffusion only. As such, image diffusion can be made aware of a priori known features of the image by restricting or stopping the diffusion process at the image edges. Such modulation may be defined by a conductivity map E sampled at each image pixel $\bar{x}$. In certain aspects, low conductivity will decrease filtering to preserve edges. Thus, the conductivity map may also be an edge map as shown by:

$$G(f)=\min_g\{\tfrac{1}{2}\|g-f\|^2+\lambda\Sigma_i g'(\nabla_{x_i}' E_{\bar{x}} \nabla_{x_i})g\}$$

where the edge map may be the same for all directions. As such, the image filtering is edge-preserving while blind to noise propagation. Thus, the filtering is linear but non-stationary if the edge map is known a priori, while estimated during the filtering process if the edge map is not known a priori, e.g., non-linear diffusion.

Noise-Driven Edge-Preserving Polar Diffusion

In embodiments, noise in the FBP process may be amplified by ramp filtering and propagated to the reconstructed image by backprojection. For example, the backprojection process operator may be decomposed as:

$$R'p_0=\Sigma_{\theta\in\Theta}R_\theta' p_0$$

The backprojection of a single projection p, whether ramp-filtered or not, indexed by θ may be described as $f_\theta=R_\theta' p$. Thus, the diffusion of the "single-backprojection" image $f_\theta$ (38 in FIG. 4) can be written as:

$$G(f_\theta)=\min_g\{\tfrac{1}{2}\|g-f_\theta\|^2+\lambda\Sigma_\theta g'(\nabla_\theta' \nabla_\theta)g\}$$

where $\nabla_\theta$ is the single-backprojection image gradient taken along direction θ. Thus, as will be understood, $\nabla_\theta$ may be modulated by the noise model 40 via:

$$G(f_\theta, W_\theta)=\min_g\{\tfrac{1}{2}\|g-f_\theta\|^2+g'(\nabla_\theta' W_\theta^{-1} \nabla_\theta)g\}$$

or modulated by the edge information/image model 42 via:

$$G(f_\theta, E_{\bar{x}})=\min_g\{\tfrac{1}{2}\|g-f_\theta\|^2+g'(\nabla_\theta' E_{\bar{x}} \nabla_\theta)g\}$$

or by both the noise model 40 and the edge/image model 42 via:

$$G(f_\theta, E_{\bar{x}}, W_\theta)=\min_g\{\tfrac{1}{2}\|g-f_\theta\|^2+g'(\nabla_\theta' C(E_{\bar{x}}, W_\theta^{-1}) \nabla_\theta)g\}$$

where C is a conductivity map which brings together the angle-independent edge map and the angle-dependent noise model. Thus, as will be appreciated, the resulting filter 34 is a polar 1D-diffusion image filter in the direction indexed by angle θ driven in intensity by the noise model $W_\theta^{-1}$ (40 in FIG. 4) as long as the edges 44 given by $E_{\bar{x}}$ (42 in FIG. 4) are preserved.

Analytical Reconstruction with Noise-Driven Edge-Preserving Polar Diffusion

In embodiments, integration of the edge and noise weighted polar filter 34 in FBP is done via substituting:

$$f_{FBP}=\frac{1}{\Omega}\Sigma_{\theta\in\Theta}f_\theta$$

where Ω is a normalizing factor. As such, diffusion polar filtering and edge preservation may be obtained by substituting $f_\theta$ by its filtered version:

$$f_{\Theta FBP}=\frac{1}{\Omega}\Sigma_{\theta\in\Theta}G_\Theta(f_\theta, E_{\bar{x}}, W_\theta)$$

Thus, the above reconstruction brings together a filtering step that avoids noise propagation while preserving edges 44.

Iterative Reconstruction with Noise-Driven Edge-Preserving Polar Diffusion

As will be appreciated, in embodiments, the filtering step inserted within the backprojection is the sum of least-squares norms, and is re-usable as a regularization term for penalized iterative reconstruction. Additionally, as the filtering step 34 includes the noise model 40, the data fidelity term does not need to carry that information anymore, which in turn provides for the following quadratic minimization:

$$J_{\Theta PLSQ}(f)=\min_f \Sigma_{\theta\in\Theta}\{\tfrac{1}{2}\|R_\theta f-p_0\|^2+f'R_\theta'C(E_{\bar{x}}, W_\theta^{-1})\nabla_\theta)R_\theta f\}$$

which is linear if $E_{\bar{x}}$ is known a priori, or non-linear if $E_{\bar{x}}$ is estimated during the reconstruction process. As such, when $C(E_{\bar{x}}, W_\theta^{-1})=\text{Id}$, where Id is an identity matrix, $J_{\Theta PLSQ}$ (f) is a standard penalized least-squares criterion where the regularization is not a diffusion filter. As will be appreciated, however, there is now space for the ramp filter $D_\theta$ to be inserted in the data fidelity term by defining the filter $D_\theta^{1/2}$ such that $D_\theta^{1/2}D_\theta^{1/2}=D_\theta$, which results in the following:

$$J_{\Theta PiFBP}(f)=\min_f \Sigma_{\theta\in\Theta}\{\tfrac{1}{2}(R_\theta f-p_\theta)'D_\theta(R_\theta f-p_\theta)+ f'R_\theta'D_\theta^{1/2}(\nabla_\theta'C(E_{\bar{x}}, W_\theta^{-1})\nabla_\theta)D_\theta^{1/2}R_\theta f\}$$

Accordingly, when $C(E_{\bar{x}}, W_\theta^{-1})=\text{Id}$, the regularization in $J_{\Theta PiFBP}(f)$ results in uniform diffusion filtering. Further, because ramp Fourier filtering can commute with the non-uniform diffusion, and because both can commute with backprojection, the following results:

$$R_\theta'D_\theta^{1/2}(\nabla_\theta'C(E_{\bar{x}}, W_\theta^{-1})\nabla_\theta)D_\theta^{1/2}R_\theta f=(\nabla_\theta'C(E_{\bar{x}}, W_\theta^{-1})\nabla_\theta)R_\theta'D_\theta R_\theta$$

where $J_{\Theta PiFBP}(f)$ applies the same filtering as presented for FBP. Thus, the regularization acts as a polar diffusion filter controlled by both the data noise model and the edge information.

As will be appreciated, the above presented formulas imply as many 1D-filtering steps as there are angles. Thus, in embodiments, sets of angles may be grouped together about a principal direction in order to reduce the number of filtering steps. For example, if the filtering directions are divided into two (2) sets, one of all angles closer to the horizontal direction, and the other of all angles closer to the vertical direction, the filtering may be accomplished as a separable step that may be faster than a 2D-regularization. In such embodiments, the level of direction grouping, i.e., the number of angles within a group, will depend on the targeted image quality.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein which may be in real-time. For example, as previously mentioned, the system may include at least one processor and system memory/data storage structures, which may include random access memory (RAM) and read-only memory (ROM). The at least one processor of the system may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a method for reconstructing an object via tomography is provided. The method includes: acquiring a plurality of projections of the object at different angles via an imaging system; backprojecting each projection of the plurality to generate an intermediate image of each projection via at least one processor of the imaging system; and applying a filter to each intermediate image via the at least one processor. The filter is based at least in part on a noise model and an image model. In certain embodiments, the method further includes generating weights for each projection of the plurality by applying the noise model to each projection via the at least one processor. In such embodiments, the filter is further based at least in part on the generated weights. In certain embodiments, the image model defines edges within each intermediate image and the filter processes the edges differently than regions in each intermediate image lacking edges. In certain embodiments, the noise model is based at least in part on one of Gaussian statistics and Poisson statistics. In certain embodiments, the method further includes generating the image model by preforming an initial reconstruction of the object based at least in part on the acquired plurality of projections via the at least one processor. In certain embodiments, the method further includes iteratively reconstructing the object based at least in part on each of the intermediate images via the at least one processor. In certain embodiments, the imaging system is at least one of an x-ray imaging system, a MRI system, a PET imaging system, a SPECT imaging system, and an ultrasound imaging system.

Other embodiments provide for an imaging system for reconstructing an object via tomography. The imaging system includes at least one processor operative to: acquire a plurality of projections of the object at different angles via an imaging device; backproject each projection of the plurality to generate an intermediate image of each projection; and apply a filter to each intermediate image. The filter is based at least in part on a noise model and an image model. In certain embodiments, the at least one processor is further operative to: generate weights for each projection of the plurality by applying the noise model to each projection. In such embodiments, the filter is further based at least in part on the generated weights. In certain embodiments, the image model defines edges within each intermediate image and the filter processes the edges differently than regions in each intermediate image lacking edges. In certain embodiments, the noise model is based at least in part on one of Gaussian statistics and Poisson statistics. In certain embodiments, the at least one processor is further operative to generate the image model via performing an initial reconstruction of the object based at least in part on the acquired plurality of projections. In certain embodiments, the at least one processor is further operative to iteratively reconstruct the object based at least in part on each of the intermediate images. In certain embodiments, the imaging device acquires the plurality of projections via at least one of x-rays, magnetic resonance signals, positron emissions, single photon emissions, and ultrasound waves.

Yet still other embodiments provide for a non-transitory computer readable medium storing instructions. The stored instructions are configured to adapt at least one processor to: acquire a plurality of projections of an object at different angles; backproject each projection of the plurality to generate an intermediate image of each projection; and apply a filter to each intermediate image. The filter is based at least in part on a noise model and an image model. In certain embodiments, the stored instructions further adapt the at least one processor to generate weights for each projection of the plurality by applying the noise model to each projection. In such embodiments, the filter is further based at least in part on the generated weights. In certain embodiments, the image model defines edges within each intermediate image and the filter processes the edges differently than regions in each intermediate image lacking edges. In certain embodiments, the noise model is based at least in part on one of Gaussian statistics and Poisson statistics. In certain embodiments, the stored instructions further adapt the at least one processor to generate the image model via performing an initial reconstruction of the object based at least in part on the acquired plurality of projections. In certain embodiments, the at least one processor forms part of at least one of an x-ray imaging system, a MRI system, a PET imaging system, a SPECT imaging system, and an ultrasound imaging system.

Accordingly, as will be appreciated, by applying a filter to the intermediate images, some embodiments of the invention provide for the ability to base the filter on both a noise model that describes statistical errors in the projection space via polar coordinate sampling, and on an image model that describes the edges of an object in image space via rectangular coordinate sampling. As will be appreciated, the ability of some embodiments to tailor the filter to the object for each intermediate image by combining the image model and the noise model in the intermediate space prior to reconstructing the object provides significant improvement in image quality over current tomography based imaging systems. In other words, by combining the image model with the noise model in the intermediate space, some embodiments of the invention provide for fine tuning of the filter.

Further, by combining the noise and image models in the intermediate space, some embodiments of the present invention make full use of the available noise information while both avoiding its propagation during the reconstruction process and also preserving a priori knowledge, i.e., the edges, as opposed to pre-filtering methods, which propagate noise but fail to preserve edges, and post-filtering methods, which suppresses noise after it has been propagated.

Further still, some embodiments provide the ability to increase image quality and/or to decrease radiation dose, as well as providing for regularized iterative reconstruction in certain CT systems and C-arm CBCT systems.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A method for reconstructing an object via tomography comprising:
   acquiring a plurality of projections of the object at different angles via an imaging system;
   backprojecting each projection of the plurality to generate an intermediate image of each projection via at least one processor of the imaging system;
   applying a filter to each intermediate image via the at least one processor prior to completing reconstruction of the object, wherein the reconstruction of the object is based at least in part on each of the filtered intermediate images; and
   wherein the filter is based at least in part on a noise model and an image model.

2. The method of claim 1 further comprising:
   generating weights for each projection of the plurality by applying the noise model to each projection via the at least one processor; and
   wherein the filter is further based at least in part on the generated weights.

3. The method of claim 1, wherein the image model defines edges within each intermediate image and the filter processes the edges differently than regions in each intermediate image lacking edges.

4. The method of claim 1, wherein the noise model is based at least in part on one of Gaussian statistics and Poisson statistics.

5. The method of claim 1, further comprising:
   generating the image model by preforming an initial reconstruction of the object based at least in part on the acquired plurality of projections via the at least one processor,
   wherein the initial reconstruction occurs prior to reconstructing the object based at least in part on each of the filtered intermediate images.

6. The method of claim 1 further comprising:
   iteratively reconstructing the object based at least in part on each of the intermediate images via the at least one processor.

7. The method of claim 1, wherein the imaging system is at least one of an x-ray imaging system, a MRI system, a PET imaging system, a SPECT imaging system, and an ultrasound imaging system.

8. An imaging system for reconstructing an object via tomography comprising:
   at least one processor operative to:
   acquire a plurality of projections of the object at different angles via an imaging device;
   backproject each projection of the plurality to generate an intermediate image of each projection;
   apply a filter to each intermediate image prior to completing reconstruction of the object based at least in part on each of the filtered intermediate images; and
   wherein the filter is based at least in part on a noise model and an image model.

9. The imaging system of claim 8, wherein the at least one processor is further operative to:
   generate weights for each projection of the plurality by applying the noise model to each projection; and
   wherein the filter is further based at least in part on the generated weights.

10. The imaging system of claim 8, wherein the image model defines edges within each intermediate image and the filter processes the edges differently than regions in each intermediate image lacking edges.

11. The imaging system of claim 8, wherein the noise model is based at least in part on one of Gaussian statistics and Poisson statistics.

12. The imaging system of claim 8, wherein the at least one processor is further operative to:

generate the image model via performing an initial reconstruction of the object based at least in part on the acquired plurality of projections.

13. The imaging system of claim 8, wherein the at least one processor is further operative to:
iteratively reconstruct the object based at least in part on each of the intermediate images.

14. The imaging system of claim 8, wherein the imaging device acquires the plurality of projections via at least one of x-rays, magnetic resonance signals, positron emissions, single photon emissions, and ultrasound waves.

15. A non-transitory computer readable medium storing instructions configured to adapt at least one processor to:
acquire a plurality of projections of an object at different angles;
backproject each projection of the plurality to generate an intermediate image of each projection;
apply a filter to each intermediate image prior to completing reconstruction of the object based at least in part on each of the filtered intermediate images; and
wherein the filter is based at least in part on a noise model and an image model.

16. The non-transitory computer readable medium of claim 15, wherein the stored instructions further adapt the at least one processor to:
generate weights for each projection of the plurality by applying the noise model to each projection; and
wherein the filter is further based at least in part on the generated weights.

17. The non-transitory computer readable medium of claim 15, wherein the image model defines edges within each intermediate image and the filter processes the edges differently than regions in each intermediate image lacking edges.

18. The non-transitory computer readable medium of claim 15, wherein the noise model is based at least in part on one of Gaussian statistics and Poisson statistics.

19. The non-transitory computer readable medium of claim 15, wherein the stored instructions further adapt the at least one processor to:
generate the image model via performing an initial reconstruction of the object based at least in part on the acquired plurality of projections.

20. The non-transitory computer readable medium of claim 15, wherein the at least one processor forms part of at least one of an x-ray imaging system, a MRI system, a PET imaging system, a SPECT imaging system, and an ultrasound imaging system.

21. The method of claim 1, wherein the reconstruction of the object is further based at least in part on $$f_{\Theta FBP} = \frac{1}{\Omega} \sum_{\theta \in \Theta} G_\Theta(f_\theta, E_{\bar{x}}, W_\theta).$$

* * * * *